Figure 1:
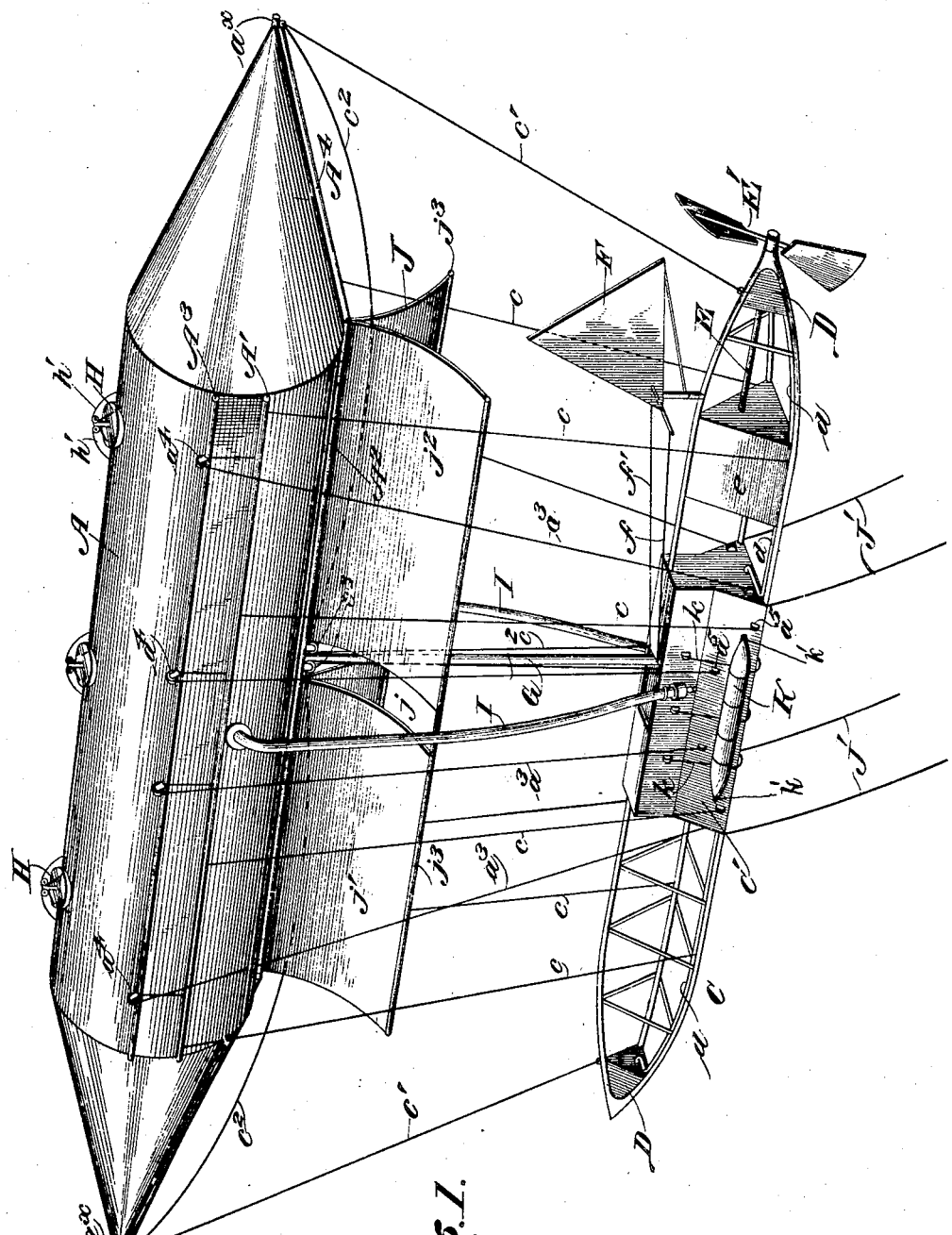

No. 887,931. PATENTED MAY 19, 1908.
C. J. A. FIESSE.
AERIAL APPARATUS.
APPLICATION FILED OCT. 31, 1901.

5 SHEETS—SHEET 1.

WITNESSES

INVENTOR

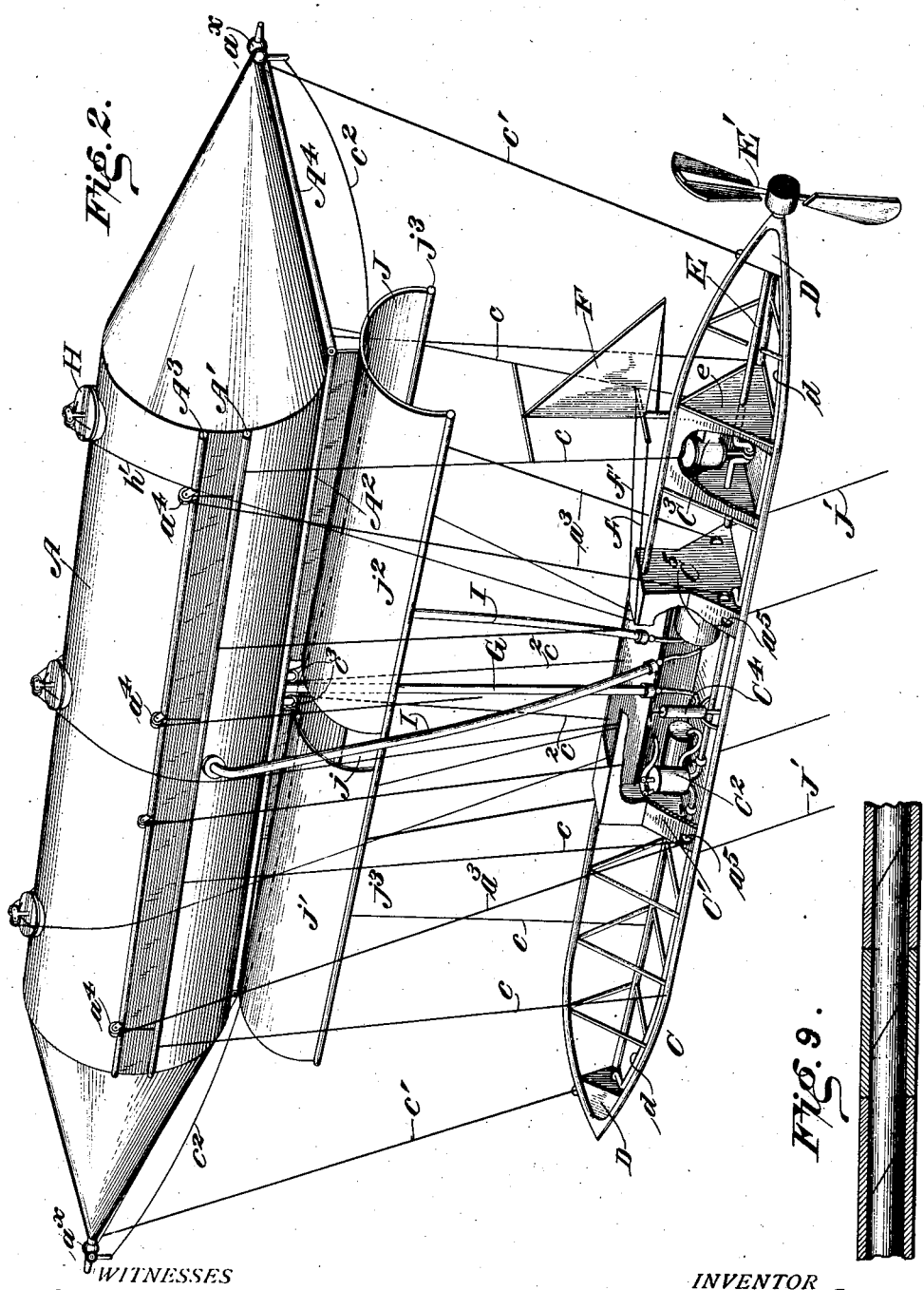

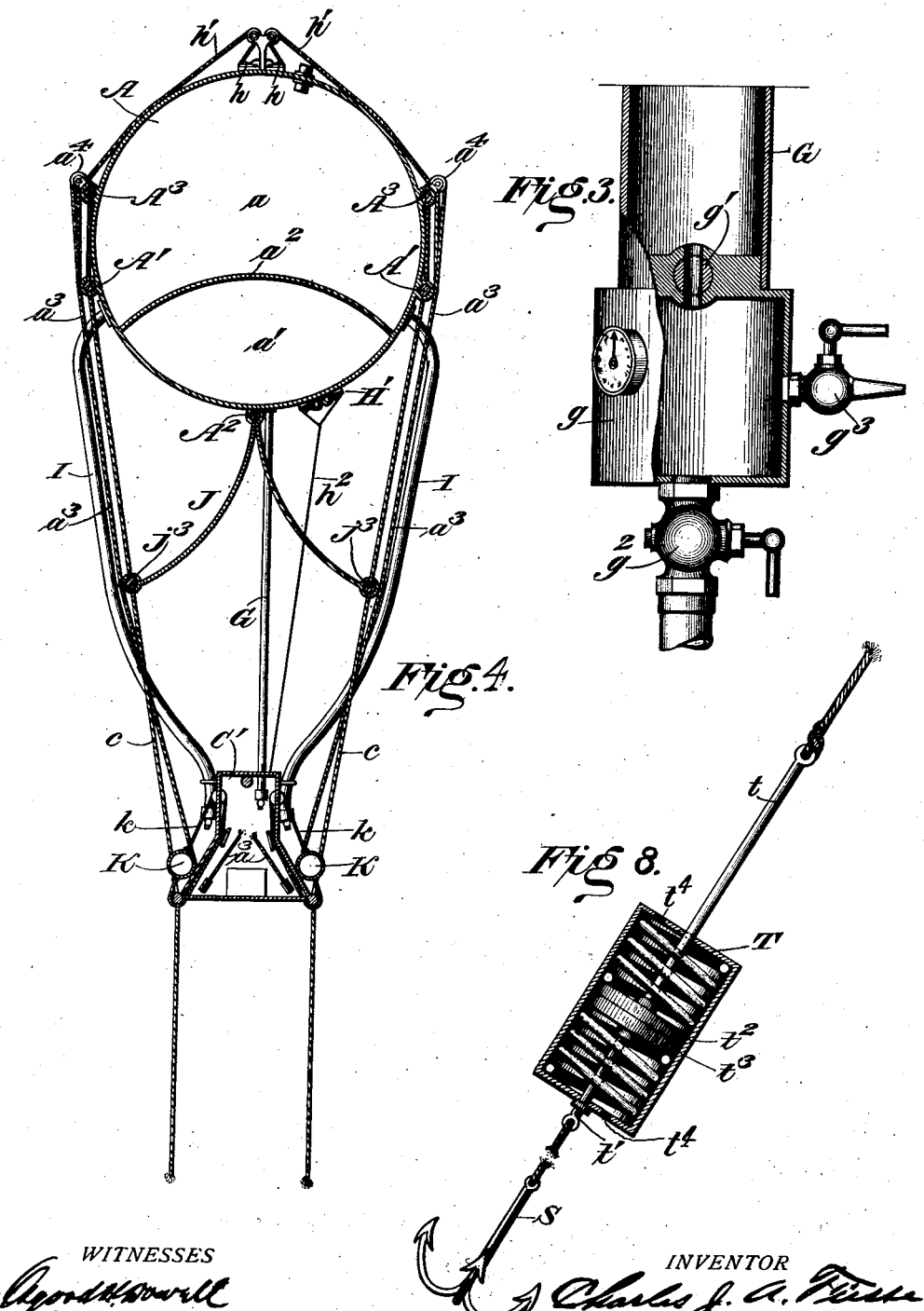

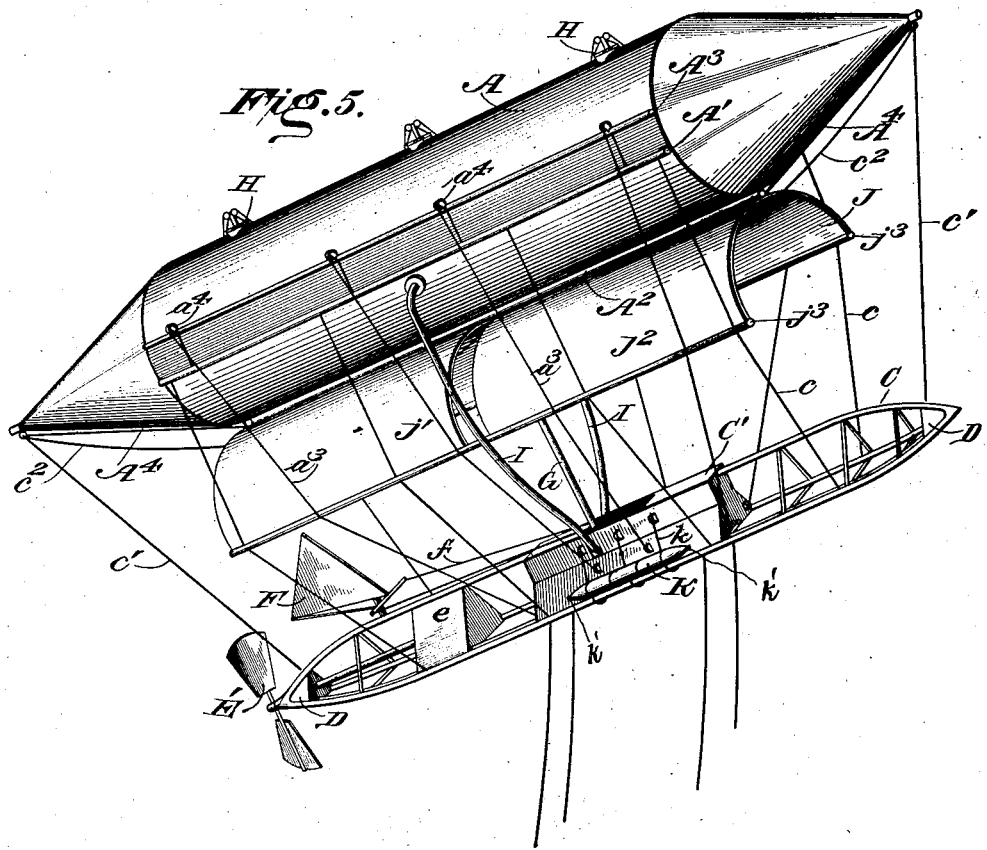

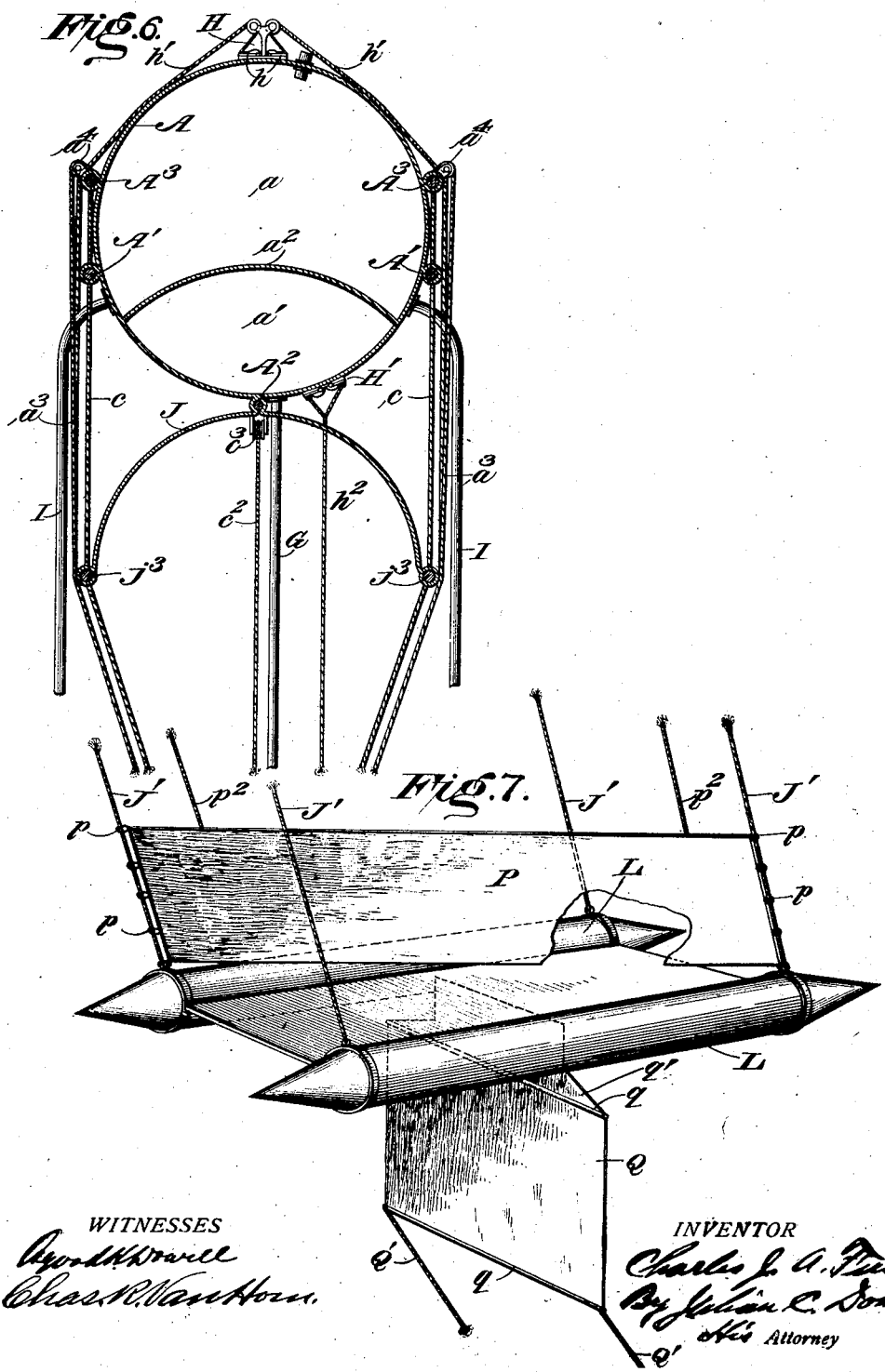

UNITED STATES PATENT OFFICE.

CHARLES J. A. FIESSE, OF WASHINGTON, DISTRICT OF COLUMBIA.

AERIAL APPARATUS.

No. 887,931.  Specification of Letters Patent.  Patented May 19, 1908.

Application filed October 31, 1901. Serial No. 80,680.

*To all whom it may concern:*

Be it known that I, CHARLES J. A. FIESSE, a citizen of the United States, residing at Washington, in the District of Columbia, have invented certain new and useful Improvements in Aerial Apparatus; and I do hereby declare the following to be a full, clear, and exact description of the invention, such as will enable others skilled in the art to which it appertains to make and use the same.

This invention relates to aerial navigation, and provides an improved construction of dirigible balloon in combination with an improved aeroplane.

The invention has for its main objects:

First, to prevent the bursting or collapse of the envelop when the airship tends to rise too rapidly to a higher altitude, by reason of either an accidental or voluntary loss of weight carried in the car, the aeroplane acting as a kind of reversed two-winged parachute to retard sufficiently the ascensional movement of the airship to give ample time to compensate for the loss of weight by an equivalent loss of gas.

Second, to provide, by the addition to the balloon of a large aeroplane, or horizontal sail, a compensating power device intended (A) to make up for the loss of ascensional power caused by different agencies, but chiefly by the air flowing against the surface of the balloon and thereby cooling the envelop and gas therein, with a rapidity proportional to the temperature of the air at the elevation in which the balloon moves, and to the speed imparted to the airship by the propeller; said loss of ascensional power necessitating the throwing out of ballast, notwithstanding the fact that the weight of the car or basket is constantly reduced by the consumption of fuel in running the motor, and consequently requiring a heavy supply of ballast, or causing the aeronaut's trip to come to a speedy end, thus preventing a long aerial voyage; (B) to make up for the dilatation of the gas when the balloon travels with the wind in a favorable aerial current and absorbs more heat from the sun's rays than it gives out by radiation and contact with the air; (C) to obviate the necessity of throwing out ballast or losing gas if the aeronaut should want, in the course of a voyage, either to rise to a higher altitude, particularly above clouds, to find out if there is a favorable current, or to lower the air ship below the clouds to find out if the inferior current is more favorable for travel than the superior current, so as to take advantage of the favorable current, be it superior or inferior, to dispense with the use of the motor, thus saving fuel and enabling the aeronaut to accomplish a longer voyage.

Third, to insure the safety of the aerial passengers by the retarding effect of the aeroplane, acting as a huge sustentator or parachute, when the airship descends to the ground.

Fourth, to enable the aeronaut to maintain the balloon against a strong wind when at anchor and held captive in mid-air, the lifting action of the wind on the aeroplane counterbalancing the lowering action of the wind on the front part of the balloon.

A further object of my invention is to take advantage of the existence of superior and inferior strata of different velocities in aerial currents. It is a well known fact, "that at the height of one mile the average velocity of the wind is four times as great as at the surface;" a fact ascertained by many aeronauts, notably by Glaisher, the 8th of April, 1863, when the balloon mounted by that savant showed a velocity of 800 meters per minute, while the anemometers at the Greenwich observatory, from which the ascension took place, showed only 50 meters per minute. For this purpose I add to the aforesaid combination a depending attachment intended to support and guide through the air, at a proper distance below the balloon, a large drag sail, to enable the aeronaut, traveling over land or water with a favorable aerial current, to keep or maintain the balloon at the desired altitude, by the action of the wind under or upon the surface of the aeroplane, notwithstanding the effect produced either by the dilatation of the gas or by its contraction, or yet by the rain or the condensation of vesicular vapors on the envelop, thus avoiding an expense of gas or ballast which, when often repeated, bring the aerial voyage to a speedy end, and, consequently, prevent the crossing of a sea or of a long stretch of continent, unless a large supply of ballast and gas is provided to meet such emergencies, at the detriment of the carrying capacity of the airship for goods. The addition of said drag has also the object of retarding the course of the airship when carried out of its course by too strong a wind.

A still further object of my invention is, by the addition of another sail to the depending attachment supporting the aforesaid drag-sail, to enable the aeronaut, when facing the wind, so as to present to the aerial current a minimum of opposing surface, to deviate the course of the airship either to the right or to the left of the direction of the wind by means of said sail, in conjunction with the use of the motor and propeller, if the course of the aerial current in which the balloon stands is not favorable to reach a desired point.

A last object of my invention is to insure to the aerial passengers greater safety by the addition, either under or on the sides of the car or basket of the airship, of two collapsing air-casings for the purpose of acting as an air-cushion when the basket strikes the ground in the landing operation at the end of an aerial voyage, or yet to serve as a buoyant body to maintain the basket on water till passengers are rescued, if the balloon loses its buoyancy when traveling over water.

With these ends in view, the invention will hereinafter be first more particularly described, with reference to the accompanying drawings which form a part of this specification, and then pointed out in the claims following the description.

In said drawings, in which corresponding parts in different views are designated by the same letters of reference: Figure 1 is a perspective view of an apparatus embodying my invention completely equipped and in a state of ascension; Fig. 2 is a similar view with a portion of the cab broken away to illustrate the controlling devices therein, said view also showing a slight modification of the aeroplane which is shown in action; Fig. 3 is a detail sectional view, on an enlarged scale, of the air-chamber in the car for controlling the supply of air to one of the compartments of the balloon. Fig. 4 is a vertical cross-section of the airship, with the aeroplane shown in the same position as in Fig. 1. Fig. 5 is a perspective view of the air-ship, shown in Fig. 2, traveling against the wind, the aeroplane being in action. Fig. 6 is an enlarged vertical cross-section of the upper portion of the apparatus as shown in Fig. 5. Fig. 7 is a perspective view of the depending attachment with drag-sail and deviator-sail. Fig. 8 is a detail view, partly in section, of the anchor. Fig. 9 is a detail fragmentary view showing a suitable construction of the stay-rods.

The apparatus comprises in the main a buoyant balloon, a car suspended therefrom, and an aeroplane attached to the balloon, together with a depending attachment supporting a drag-sail and an obliquely-disposed deviator-sail above said depending attachment.

A denotes the balloon, consisting of an elongated buoyant body, having conical ends. The inflatable envelop thereof is made of suitable impervious fabric adapted to withstand high internal pressure when opposing strong winds. Along opposite sides of the central portion of the balloon are secured longitudinal stay-rods, $A'$ $A^3$, two parallel rods at each side, which are preferably incorporated in the envelop by means of tucks in the fabric. These stay-rods are intended to distribute the strain, and secure permanence of form, straightness and rigidity of the balloon, thereby guarding against curvature and flapping which is so detrimental to the motion of the balloon as it forces its way through the air. Said stay-rods may be formed of sections of metallic tubing filled with cores of wood or other light material to stiffen them, the sections being detachable to permit disconnection and packing in a small compass for storage or transportation. A similar stay-rod $A^2$ is arranged along the bottom of the balloon, secured in a tuck of the fabric; and shorter rods $A^4$ are likewise secured to the under sides of the conical ends of the balloon; the latter rods $A^4$ being connected to the central rod $A^2$ so as to co-act therewith in strengthening and stiffening the inflatable body and its conical ends.

The balloon A is preferably interiorly divided transversely by a longitudinal diaphragm or web $a^2$ into two compartments $a$ and $a'$, for buoyant gas and air respectively, which are supplied from suitable apparatus within the car, as hereinafter explained. When the air-compartment $a'$ is inflated, the diaphragm is raised, as shown in Fig. 4, reducing the capacity of the gas-compartment $a$; but said air-compartment may be partially or wholly emptied of air, and the gas-compartment or main buoyant portion of the balloon permitted to develop to its full extent.

The car or basket, suspended from the balloon, preferably consists of an elongated triangular frame C of bamboo or other light material, supporting a central housing or cab $C'$ for the operators and passengers, and the machinery and implements employed in operating the airship. In this case the frame C is suspended from the stay-rods $A'$ by suspension wires or ropes $c$; said wires being connected to the rods by passing them through both the rods and the fabric inclosing them. From said stay-rods $A'$, small cables or cords $a^3$ pass upward and over pulleys $a^4$ attached to the stay-rods $A^3$, which latter are above and parallel with the rods $A'$. Thence said cords $a^3$ pass downward to the cab $C'$, which they enter beneath pulleys $a^5$, and they may be secured by any suitable means within the cab. By pulling down on said cords $a^3$ (which may be connected to a suitable power drum), the two sets of stay-rods $A'$ and $A^3$ will be drawn toward each other, and the fabric between said rods will be folded together; so that if, for any reason, the gas pressure in the gas-compartment of the balloon should become reduced, the fabric can be readily taken up to effect a reduction in size and thus maintain the rotundity of the envelop. Suspensory wires or cables $c'$ are also arranged between the conical ends of the balloon and the ends of the car.

Tanks D D are placed at the ends of the frame C, one at each end, to be partially filled with water or other liquid, and connected by a pipe $d$ leading through the cab C'. A pump $C^2$, located in the cab, is connected into the pipe $d$, so that the liquid may all be pumped into either tank, or may be divided in any required proportions between the two tanks, thus serving as a means for changing the inclination of the apparatus. This liquid will also serve as ballast, to be ejected from the car by the pump, when necessary. It is well known that apparatus of this character are extremely sensitive to any increase or decrease in weight, or any change of location of weight. Hence, if the amount of liquid in the two tanks be equal, the apparatus will ordinarily maintain a substantially level position. But if some of the liquid in one tank be pumped into the opposite tank, the equipoise will be destroyed and the balloon caused to tilt, according to the amount of weight thus transferred. This contrivance gives the operator control of the inclination of the apparatus, as well as providing a more regular and easier disposal of ballast.

For propelling the airship, a motor $C^3$, preferably of great power and comparative lightness, is carried by the car, the same being shown housed within a cab $e$ therefor. Said motor drives a shaft E which carries a propeller E' at the stern or rear end of the car frame. A rudder F is also mounted upon the car frame and supplied with operating cords $f f'$ which lead into the cab C' within reach of the operator.

For supplying air under pressure to the air-compartment $a'$ of the balloon A, a pipe G extends from said compartment down into the cab C', and is connected to an air pump $C^4$ of any suitable construction; a chamber $g$ (Fig. 3) being attached at the lower end of the pipe G and having a valve $g'$ therein communicating through said pipe with the compartment $a'$, and having a valve $g^2$ located between the chamber and the connection to the supply pump $C^4$, and an outlet valve $g^3$ leading from the chamber to the open air. Said chamber may also be provided with a pressure gage, as shown, for ascertaining the pressure of the air at will. By this means, the air-compartment $a'$ under the balloon may be supplied with air under any degree of pressure and the required pressure maintained. If, however, it is deemed expedient to reduce the pressure, the valve $g^2$ will be closed and the valve $g'$ and $g^3$ opened when the surplus air in the compartment $a'$ will escape.

For supplying the gas-compartment $a$ with buoyant gas, a suitable generator $C^5$ in the cab is connected to one or more pipes I leading to said gas-compartment $a$. Gas escape valves H are shown arranged at the top of the balloon, each consisting of two wings $h$ hinged together centrally, and held normally closed by springs, operating cords $h'$ being provided for opening said valves from the cab. One or more similar valves $h'$ may be connected with the air-compartment $a'$, as shown in Fig. 4, and provided with an operating cord $h^2$ leading to the cab, so that the air may be suddenly exhausted from said air-compartment, if, for any reason, either by accident or intention, the gas escapes from the compartment $a$ so as to permit the transformation of the lower part of the balloon into a kind of parachute resting on the curved aeroplane. The conical ends of the balloon are also provided with check valves $a^x$, adapted when opened to permit the gas to escape when the balloon is collapsed, to enable said ends to be also collapsed and properly folded in compact form.

The aeroplane is indicated by the letter J. It is supported between the car-frame and the balloon and is preferably formed of similar impervious fabric, and in two parts $j'$ and $j^2$, with an open space $j$ between them; the said parts being secured centrally along the lower side of the balloon by the same tuck in the fabric which embraces the stay-rod $A^2$, while their lower edges are provided with and joined together by stay-rods $j^3$, which may be hemstitched or otherwise secured into the edges of the fabric, and serve to straighten the fabric and insure proper action of the aeroplane. The said stay-rods $j^3$ are connected with the cords $c c$ by which the car-frame is suspended from the balloon; this connection being conveniently made by passing said cords through apertures in the rods, as shown, or by any other suitable means. The aeroplane is thus firmly secured to the stay-rods and supported in proper position below the inflated body or balloon proper. It may be desirable, in some circumstances, to connect the aeroplane with the inflatable body nearer one end than the other, as by means of a long angular gore of the fabric inserted between the aeroplane and the stay-rod $A^2$, as shown in Fig. 2, in order that the aeroplane may be normally supported at a slight angle to the inflatable body; said angular gore serving besides as a kind of ventral fin or stationary rudder to maintain the balloon in proper direction. This arrangement will insure at all times the requisite inclination of the aeroplane. Here I should say the aeroplane can form either of two curved surfaces; one, as shown in Fig. 1, where the balloon, being under the action of the propeller, is kept from rising by the action of the air passing over and exerting pressure upon the aeroplane instead of under it; the other, a single curved surface, as shown in Figs. 2 and 3, where the air passes under the aeroplane. In this latter position, the resistance offered to the air by the apparatus, when forcing its way onward, serves to raise the apparatus to a higher level, besides adding greatly to the safety and stability of the apparatus.

Tubular air-casings K K of suitable fabric, and preferably with conical ends, may be suspended upon either side of the cab and are adapted to be inflated with air; the ends of these casings having apertures or valves, closed by plugs or corks $k'$, which will resist the ordinary pressure from within the casings but may be easily removed. The casings K K, by means of suitably connected cords $k k$, are adapted to be drawn down beneath the cab when the apparatus is descending, in order to form air-cushions to receive the impact with the earth, thus breaking the force of the descent, and preventing injury to the apparatus or its occupants. If the descent is too rapid and the impact correspondingly severe, the sudden increase of pressure will drive the corks or other plugs from the apertures and allow the air to escape, thus relieving the pressure and preserving the casings. If the descent be upon water, said air-casings will naturally assist in supporting the apparatus, and thus serve as life-preservers, or additional buoyant supports for the apparatus. The air-cushions K K serve also as "buffers" to effectually resist the injurious effects of any impact of the apparatus with surrounding objects.

Referring to the depending attachment, shown in Fig. 7, which by means of suitable guy-ropes $J'$ is suspended from the car, the same comprises principally two elongated cylinders L L with preferably conical ends, arranged parallel and spaced apart, and having a light connecting web or platform of fabric similar to that of the aeroplane, or other suitable material. The cylinders may be constructed of wood or some light metal, such as aluminum alloy or of impervious fabric; and each cylinder may consist of a number of separate sections united by water tight and air tight joints, the sections being detachable to permit packing. A series of transverse bars may connect and keep the series apart and form a support for the fabric web. Above said attachment is an obliquely-disposed deviator-sail P, consisting of a web of suitable canvas or other material rendered impervious to water, and connected slidably as by rings $p$ to the diagonally opposite guy-ropes $J'$, so that said deviator-sail may be elevated by means of draw-ropes $p^2$ leading up to the car above. The lowermost pair of the rings $p$ may be secured permanently to the ropes $J'$, the deviator-sail being thus capable of elevation only to the extent of its width as shown in Fig. 7. When the deviator-sail is not needed, the releasing of a draw cable $p^2$ will permit the same to drop downward and lie inoperative upon the depending attachment. When elevated, as shown in Fig. 1 and brought beneath the basket, said deviator-sail will serve as an oblique abutment against air currents to cause the airship to be deviated by the pressure of the air as the balloon travels forward under the impulse of the propeller, the balloon presenting its front to the action of the wind. Beneath said depending attachment is suspended a "retardator" or drag-sail Q of canvas or other material rendered impervious to water, and having horizontal supporting bars $q$ inserted in hems in its upper and lower edges and connected by guys $q'$ centrally beneath the depending attachment, as shown. Leading downward from the lower corners of the drag-sail are ropes $Q'$ of any suitable length, which are adapted to serve the ordinary purpose of drag ropes in aeronautic operations beside keeping the drag sail in proper position for operation.

In Fig. 8 is shown the anchor S, with its connecting ropes or draft cable and surge reliever. The draft cable, by which the anchor is connected to the car, is in two parts, the adjacent ends of the line being connected to piston rods $t$ $t'$, the adjacent ends of which rods are provided with piston heads $t^2$ $t^3$ within a cylinder T. Between the piston heads and the cylinder heads springs are arranged and adapted to exert their force to maintain the piston heads normally in contact. Any tensile strain exerted upon the cable (as when the anchor engages the ground) will cause compression of the springs and thereby absorb the strains and prevent injurious effect by the sudden gripping of the anchor. The cylinder and its springs thus serve (as well as the air inside the cylinder) as a "surge reliever." Air relief apertures $t^4$ may be formed in the cylinder heads.

In operating the apparatus, the compartments $a$ and $a'$ are filled with gas and air, respectively, the gas entering by one or both of the supply ducts I, and the air entering by the duct G. The balloon will be of sufficient size so that when the aeroplane, car and other attachments are properly connected the apparatus will attain a state of equipoise in the air, and the envelop present a fully developed surface. The pressure of air in the compartment $a'$ will not generally be much above ordinary atmospheric pressure, and may be readily increased or decreased, at will, by the operator by means of the pump within the cab.

If little or no wind is blowing, the aeronaut will of course depend upon his propeller to run the airship, having first disposed the rudder to steer the same in the desired direction. Should a strong wind be blowing and favorable to the apparatus, that is if the airship is traveling in and with the wind, it would be necessary merely to maintain the apparatus in its equipoised condition as long as the aeronaut desires to travel that way without gaining on the wind by employing the propeller. In such cases, the deviator-sail P is usually rendered inoperative by being lowered down upon the connecting web of the depending attachment, or drawn up and tied under the floor of the car.

The aeroplane, if secured as shown in Fig. 1, will not be affected while the balloon is in horizontal position; but it will be affected by the air if secured as shown in Fig. 2, or if the balloon assumes or is caused to assume an inclined position by transference of the liquid-contents of the tanks D to that end of the apparatus which it is designed shall be the lower. The action of the air on the aeroplane may exert a lifting or a lowering force, according to whether the air-currents or pressure operate aganist the under or upper surface of the aeroplane, depending upon the direction of inclination of the aeroplane. Hence the aeroplane can be availed of either to maintain the apparatus at a substantially constant elevation, or to gain ascensional or descensional power, thereby avoiding the ejection of ballast in one case and the waste of gas in the other case. For example, as the airship travels forward under action of the propeller, the aeroplane being inclined forwardly and upwardly or in the position shown in Fig. 2, it will serve to sustain the airship at substantially the desired elevation during its flight, notwithstanding loss of buoyant or ascensional power due either to leakage or to cooling of the gas within the envelop, or from other causes; since the wind exerts a lifting action or upward pressure which counteracts such loss of buoyant or ascensional power. On the other hand, in the event of an undesirable increase of ascensional power, as by dilatation of gas under action of the sun's rays upon the balloon or by loss of ballast, the aeronaut by transferring liquid to the forward pump D may lower the front end of the air-ship, causing the aeroplane to incline forwardly and downwardly so that the air will act upon its upper surface and counteract the tendency of the balloon to rise under such increased ascensional power; or, if the aeroplane is secured as shown in Fig. 2, the same effect may be gained by backing the propeller, or by steering the airship around so as to present its stern forward in opposition to the wind. It will be seen that by means of the aeroplane, the aeronaut is largely enabled to control or maintain the desired elevation of the airship, or to obtain increased ascensional or descensional power to compensate for fluctuations in the buoyancy of the balloon from various causes, without continual throwing out of ballast and ejection of gas, the rapid consumption of which ordinarily prohibits any lengthy aerial journey.

In addition to the foregoing functions, the aeroplane serves also to retard any sudden ascent or descent of the balloon, resulting from loss of ballast or gas either from accidental or voluntary causes. For example, in the event of decrease of weight carried by the car, resulting in a tendency of the balloon to rise rapidly to a higher altitude, the aeroplane, assuming the position shown in Fig. 1, will act as a kind of reversed two-winged parachute to retard sufficiently the ascension of the airship so as to give ample time to compensate for the loss of weight by an equivalent loss of gas. On the other hand, when the airship descends to the ground, or should there be any tendency to sudden descent by accident, the aeroplane assuming a position such as shown in Figs. 2 and 5 would act as a huge sustentator or parachute, insuring the safety of the passengers. By means of the aeroplane, the aeronaut is also enabled to maintain the balloon at anchor in mid-air, the lifting action of the wind on the lower surface of the aeroplane counteracting the lowering action of the wind on the front part of the balloon.

The depending attachment with the drag-sail Q, in connection with the aeroplane, enables the aeronaut, when traveling in a favorable aerial current without using the propeller so as to save on the fuel expense, to take advantage of the existence of superior and inferior strata of aerial currents of different velocities, as well as to insure the working of the aeroplane as a compensating device in case of such contingency as a breakdown in the machinery or the propeller, to maintain the balloon at the desired altitude, notwithstanding dilatation or contraction of gas, or other causes of fluctuation in buoyant capacity, or yet to insure the working of the aeroplane as a compensating device in case of such contingency as a break-down in the machinery or the propeller. In making use of this device, the aeronaut lowers to a suitable distance beneath the car the said depending attachment, which thus supports the drag-sail in a stratum or current of different velocity from that in which the balloon travels; the balloon having first been caused to present its front either fore or rearward in opposition to the wind, so that the air is caused to pass either beneath or upon the aeroplane to produce an upward or a downward pressure to maintain the airship at the proper elevation without an expense of ballast or gas.

By means of the deviator-sail P the aeronaut is enabled to take advantage of aerial currents which are indirectly favorable, as for instance, if the wind blows from the north or from the south and the aeronaut desires to travel northeast or southeast. In this case, he simply raises the depending attachment under the basket, and after rendering the drag-sail Q inoperative by pulling it under the depending attachment, he secures the deviator-sail P in a proper position between the suspension ropes of the depending attachment; and he then directs the course of the airship against the wind by the use of the rudder and propeller as if moving forward in a calm atmosphere; and the airship will thereby move to the right or to the left of the direction of the wind according to the parallelogram of force, one force (that imparted by the propeller) pushing the airship toward the south or north, while the other force (that imparted by the wind on the deviator) pushing the airship toward the east or west.

I should say that with the present device I rely principally on the knowledge and use of the regular atmospheric currents, both superior and inferior, as well as on the trade winds and monsoons to reach any desired point, if the envelop of the balloon is made sufficiently impervious to stand several days and even a week, without appreciable loss of buoyancy by endosmosis.

The direction followed by the balloon when in a cloud or a fog obstructing the sight of the country over which the balloon travels, or yet when the balloon travels over the sea, is given by the suspension ropes to which the drag-sail Q is secured, said suspension ropes acting as a sort of trail. The aeronaut, to ascertain the direction followed by the balloon, has only to report the trailing line upon a protractor, and by that means he is enabled to alter the course of the balloon the proper way.

When traveling over sea the aeronaut may wish to retard the motion of the balloon to wait for some vessel or to keep on observations or patrol duty on a selected surface; in such a case the drag-sail Q is lowered into the sea where the attachment acts as a float or support while the sail acts as a drag to retard the motion of the balloon, and in the same time to maintain it in mid-air, notwithstanding a loss of ascensional power, if the aeroplane, as shown in Fig. 1, is disposed so as to be acted upon by the prevailing wind, or if the aeroplane is secured as shown in Fig. 2.

It may happen that the aeronaut either wishes to anchor to the ground without descending till the car rests on it, or wishes to use the balloon as an aerial observatory or a station for wireless telegraphy or for other purposes; in such cases the proper use of the aeroplane, as explained herein will afford the means to stay in mid-air as long as wanted, notwithstanding strong wind, loss of gas or loss of ballast.

When the aeronaut has attained the end of his voyage and descension begins, air is forced into the compartment $a'$ to replenish it and maintain rotundity of the inflatable body, and if the supply of air is not sufficient to maintain the full rotundity, by reason of a great loss of gas, as the apparatus descends farther and farther down, the draw-cords $c$ are brought into action and the rods $A^1$ and $A^3$ are drawn toward each other, decreasing the area of the compartment $a$ and thus maintaining the rotundity of the balloon.

It will be observed that my present invention makes possible a long aerial voyage, in view of the provision for raising or lowering the air ship by means of the aeroplane, so as to find out, at any time, the direction of the aerial current above or below the line of travel, in order to utilize the superior or inferior aerial currents for propulsion, thereby saving an expense of fuel, and in view of the advantages realized by the aeroplane in affording increased ascensional or descensional power, thereby saving an expense of ballast or of gas; so that it is only necessary for the car to carry a moderate supply of fuel, ballast and gas, such as suited to the carrying capacity of the airship.

It will be understood that the apparatus is susceptible of various modifications in details of construction and arrangement without departing from the scope of my invention which is capable of embodiment in other forms than herein shown and specially that the aeroplane as a compensating device, could be rendered inoperative, when desired, by lowering by any suitable arrangement of pulleys and ropes, the two stay-rods $j^3$, so as to bring them and the aeroplane directly under and parallel to the stay-rod $A^2$, as a kind of depending attachment or vertical plane.

Having thus fully described my invention what I claim as new and desire to secure by Letters Patent of the United States, is:

1. An aerial apparatus comprising an elongated balloon and a flexible longitudinally-disposed aeroplane carried thereby, said aeroplane having its medial line and sides substantially fixed relative to the balloon and adapted to flex or curve between said medial line and sides, whereby said aeroplane is reversely operative by air-pressure, beneath or above the same, exerting a lifting or a lowering force accordingly.

2. An aerial apparatus comprising an elongated balloon, an aeroplane of flexible material midwise secured longitudinally to the middle of the under side of the balloon, and means securing the sides of said aeroplane, allowing an upward or downward inflation of the aeroplane under action of the air or wind against its under or upper surfaces.

3. An aerial apparatus comprising an elongated balloon, a car suspended therefrom, and an aeroplane of flexible material secured longitudinally midwise to the under side of the balloon and having its opposite sides connected to the suspension ropes of the car, thereby holding said sides of the aeroplane in relative fixed position, and allowing inflation thereof by the action of the air either beneath or above the same.

4. In an aerial apparatus, an elongated buoyant body, a car suspended therefrom by suitable means, a flexible aeroplane secured longitudinally midwise to the under side of said body by an angular gore supporting it at an angle to the balloon to give it the proper inclination and concur in keeping the apparatus to the wind, and stay-rods secured to the outer side edges of said aeroplane, and means for maintaining said stay-rods apart, to insure proper action of said aeroplane, substantially as described.

5. An aerial apparatus comprising an elongated balloon, a car suspended therefrom, a longitudinal aeroplane arranged between the car and balloon, and a drag-sail and means for suspending the same beneath the car.

6. An aerial apparatus comprising an elongated balloon, a car suspended therefrom, a longitudinal aeroplane between the car and balloon, a depending-attachment with means for suspending the same below the car, and a drag-sail suspended from said attachment.

7. An aerial apparatus comprising an elongated balloon, a car suspended therefrom, a rudder and a propeller with means for operating the same from the car, and an obliquely-disposed deviator-sail, with means for rendering the same operative or inoperative, whereby an indirectly-favorable wind can be availed of by employing the resultant of forces exerted by the propeller and by the wind on said deviator-sail when the apparatus is pointed to or with the wind.

8. In an aerial apparatus, an elongated balloon of cylindrical form with conical ends, an aeroplane secured longitudinally midwise to the lower side thereof and sidewise to the suspension ropes, a car suspended from the balloon, and a depending attachment suspended from the car for the purpose of supporting a drag-sail at a sufficient distance below the balloon to insure retardation of the course of the airship, substantially as described.

In testimony whereof I affix my signature, in presence of two witnesses.

CHARLES J. A. FIESSE.

Witnesses:
 OSGOOD H. DOAREL,
 CHAS. R. VAN HORN.